United States Patent
Fahland et al.

(10) Patent No.: US 8,886,432 B2
(45) Date of Patent: Nov. 11, 2014

(54) VEHICLE BRAKE SYSTEM AND METHOD OF OPERATING THE SAME

(75) Inventors: Jason D. Fahland, Brighton, MI (US); Patrick J. Monsere, Highland, MI (US); Brandon C. Pennala, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 206 days.

(21) Appl. No.: 13/554,552

(22) Filed: Jul. 20, 2012

(65) Prior Publication Data
US 2014/0025271 A1    Jan. 23, 2014

(51) Int. Cl.
*G06F 19/00* (2011.01)
*B60T 13/00* (2006.01)

(52) U.S. Cl.
USPC .............................................. 701/70; 303/20

(58) Field of Classification Search
CPC ............... B60T 7/085; F05B 2260/902; F05B 2270/324; F05B 2270/325; F02D 2200/0606; G08B 3/10
USPC .................................. 701/22, 70, 80; 303/20
See application file for complete search history.

(56) References Cited

U.S. PATENT DOCUMENTS

| | | |
|---|---|---|
| 2010/0235065 A1 * | 9/2010 | Logan et al. ..................... 701/80 |
| 2010/0256885 A1 | 10/2010 | Logan et al. |
| 2013/0047702 A1 * | 2/2013 | Feldmann et al. ........... 73/23.31 |

\* cited by examiner

*Primary Examiner* — Muhammad Shafi
(74) *Attorney, Agent, or Firm* — Lionel D. Anderson; Reising Ethington P.C.

(57) ABSTRACT

A vehicle brake system and method that are designed to improve the driver braking experience by compensating for the effects that humidity and temperature can have on brake performance. According to one embodiment, the method determines if a braking event is underway and, if so, it measures humidity and brake temperature. With this information, the method is able to compensate for anticipated changes in the coefficient of friction ($\mu$) of one or more brake components, such as brake pads or rotors, and to provide a modified brake command signal accordingly.

14 Claims, 3 Drawing Sheets

VEHICLE BRAKE SYSTEM AND METHOD OF OPERATING THE SAME

FIELD

The present invention generally relates to a vehicle brake system and, more particularly, to a method for operating a vehicle brake system under various temperature, humidity and/or other conditions.

BACKGROUND

There are numerous types of vehicle brake systems, including those that include hydraulically actuated disk brakes. In such a system, engagement of a brake pedal by a driver causes a hydraulic piston to actuate a caliper out at the wheel that pinches a rotor between a pair of brake pads. The caliper carries the brake pads which frictionally interact with the spinning rotor and slow it down according to a number of factors, including the coefficient of friction ($\mu$) of the materials.

The coefficient of friction ($\mu$) of a brake pad and/or a rotor can be affected by the temperature of the system, as well as the humidity of the surrounding atmosphere. When a vehicle is stationary during extended periods of high humidity, moisture can cause rotor corrosion or alter the transfer layer properties which can increase the coefficient of friction ($\mu$) and make the brake pads grab the rotor in a more aggressive way; this condition is sometimes referred to as 'grabbing'. If the brake pad and/or the rotor is dry due to low-moisture or low-humidity conditions, then the coefficient of friction may decrease so that the brakes react in a less aggressive fashion. In some instances, the increased and/or decreased coefficients of friction are noticeable to the driver and are, thus, undesirable.

SUMMARY

According to one embodiment, there is provided a method of operating a vehicle brake system. The method may comprise the steps of: (a) receiving humidity readings from a humidity sensor; (b) using the humidity readings to generate a modified brake command signal that compensates for moisture in the vehicle brake system; and (c) controlling one or more aspects of the vehicle brake system according to the modified brake command signal.

According to another embodiment, there is provided a vehicle brake system. The vehicle brake system may comprise: a humidity sensor that provides humidity readings; an electronic module that is coupled to the humidity sensor and receives the humidity readings, the electronic module is configured to use the humidity readings to generate modified brake command signals; and a frictional braking system that is coupled to the electronic module and receives the modified brake command signals. The modified brake command signals control the frictional braking system in a manner that compensates for moisture in the vehicle brake system.

DRAWINGS

Preferred exemplary embodiments will hereinafter be described in conjunction with the appended drawings, wherein like designations denote like elements, and wherein.

DESCRIPTION

The vehicle brake system and method described herein are designed to improve the driver braking experience by compensating for the effect that humidity and temperature can have on brake performance. According to one embodiment, the present method determines if a braking event is underway and, if so, it measures one or more braking conditions like humidity and temperature. With this information, the method is able to adjust or compensate for changes in the coefficient of friction ($\mu$) that can occur in brake components, such as brake pads or rotors, and to provide a modified brake command signal accordingly. This results in an improved braking experience, especially during the first few frictional braking events that follow an extended period of time when the vehicle is sitting still and moisture is accumulating on the brake components.

Although the exemplary method is described herein in the context of a brake-by-wire system, such as an electro-hydraulic braking (EHB) system or an electro-mechanical braking (EMB) system, it should be appreciated that the method may also be used with any number of other braking systems and is not limited to the disclosed embodiment. For example, the present method may be used with other brake-by-wire systems, regenerative braking systems (e.g., those found in hybrid vehicles, battery electric vehicles, etc.), as well as other brake systems using other types of technologies (e.g., disc brakes, drum brakes or a combination thereof). These are only some of the possibilities, as the present method could be used with any vehicle brake system that uses frictional braking.

Figure 1:
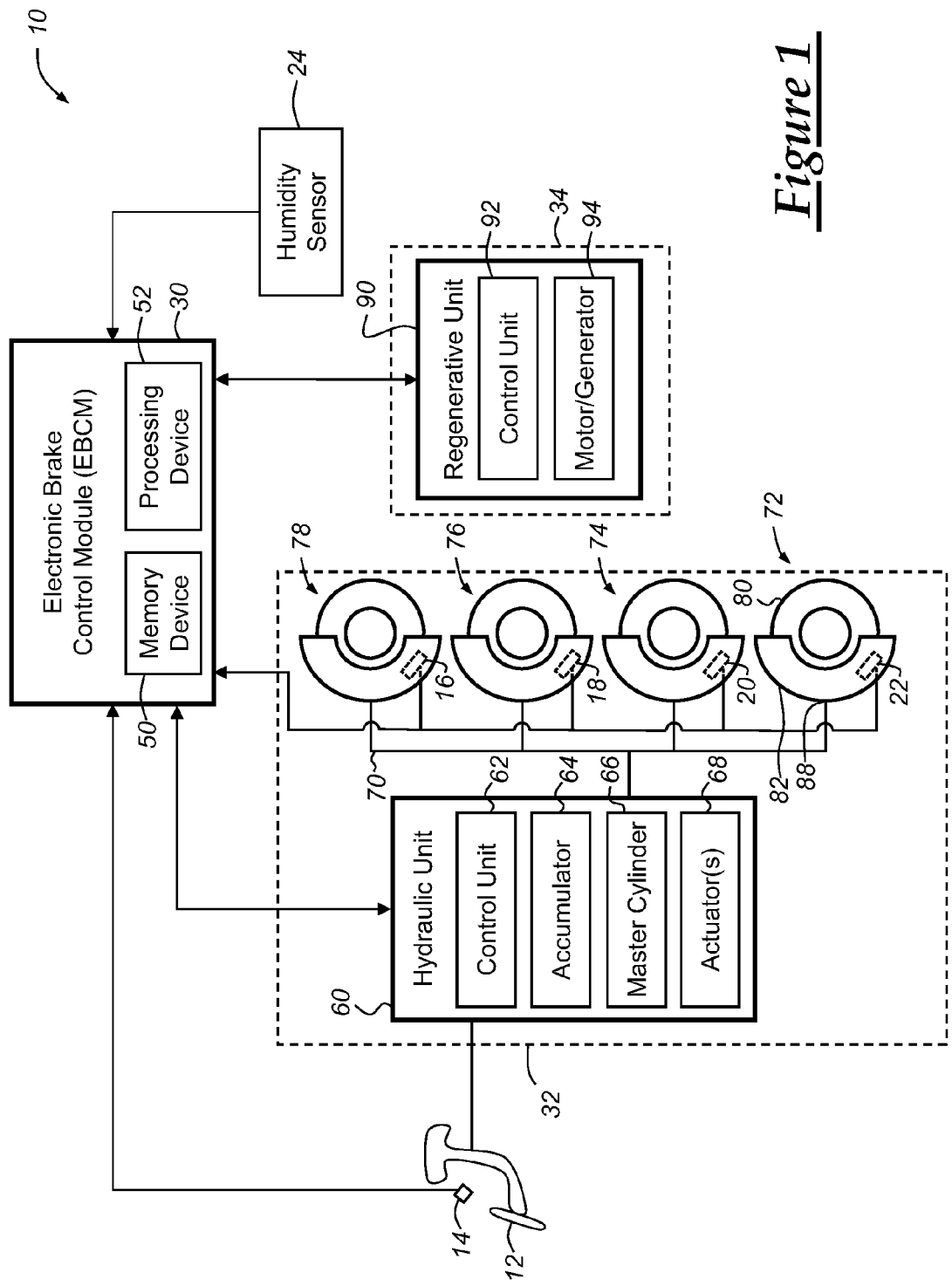
FIG. 1 is a block diagram of an exemplary vehicle brake system that has both regenerative and frictional braking capabilities.

With reference to FIG. 1, there is shown a block diagram of an exemplary vehicle brake system 10 that has both frictional and regenerative braking capabilities and generally includes brake pedal sensor 14, brake temperature sensors 16-22, humidity sensor 24, electronic module 30, frictional braking system 32, and regenerative braking system 34. Vehicle brake system 10 and the method described below can be used with a wide variety of vehicles, including a standard internal combustion engine (ICE) vehicle, hybrid electric vehicle (HEV), a plug-in hybrid electric vehicle (PHEV), an extended range electric vehicle (EREV), or a battery electric vehicle (BEV), for example, that utilizes a combination of frictional and regenerative braking to control the speed of the vehicle and to generate electrical energy. In such an arrangement, frictional braking torque may be generated in a conventional manner and counteracts the forward momentum of the vehicle through frictional resistance created by disc brakes, drum brakes, etc. Regenerative braking torque, on the other hand, may be generated by operating an electric motor in a reverse direction so that it acts as a generator, which in turn creates an electromagnetically-derived torque that acts against the forward momentum of the vehicle (this process also charges a battery that can later be used to propel/power the vehicle). As mentioned above, it is not necessary for the vehicle brake system and method to be used with a vehicle having both frictional and regenerative braking capabilities, as they could be used with a vehicle having only frictional braking or some other braking arrangement.

Brake pedal 12 is a pedal or lever that is operated by the driver and, according to this particular embodiment, is monitored by brake pedal sensor 14. In a brake-by-wire application, like the exemplary EHB system shown here, brake pedal 12 may be mechanically coupled to a brake pedal simulator or emulator by way of a spring mechanism or the like for conveying the expected mechanical feel to the driver. The brake pedal simulator may also include other mechanical and/or electronic components, including sensors, etc. Skilled artisans will appreciate that brake pedal 12 may also be mechanically coupled to a master cylinder, for example, which acts as a mechanical backup in the event that the brake-by-wire system experiences some type of malfunction.

Any number of different sensors, components, devices, modules, subsystems, systems, etc. may provide vehicle brake system 10 with information or input that could be used with the present method. These include, for example, the exemplary sensors shown in FIG. 1, as well as others that are known in the art but are not shown here. It should be appreciated that brake pedal sensor 14, brake temperature sensors 16-22, humidity sensor 24, as well as any other sensor located in and/or used by vehicle brake system 10 may be embodied in hardware, software, firmware or some combination thereof These sensors may directly sense or evaluate the conditions for which they are provided, or they may indirectly evaluate such conditions based on information provided by other sensors, components, devices, modules, subsystems, systems, etc. Furthermore, these sensors may be directly coupled to electronic module 30, indirectly coupled via other electronic devices, coupled over a vehicle communications bus, network, etc., or coupled according to some other arrangement known in the art. In addition, these sensors may be integrated within a vehicle component, device, module, subsystem, system, etc. (e.g., sensors provided within an engine control module, an energy management system, an antilock braking system (ABS), etc.), they may be stand-alone components (as schematically shown in FIG. 1), or they may be provided according to some other arrangement. It is possible for any one of the sensor readings described below to be provided by an engine control module, a transmission control module, a brake control module, a traction control module, or some other component, device, module, subsystem, system, etc. instead of being directly provided by an actual sensor element. In some instances, multiple sensors might be employed to sense a single parameter (e.g., as a means for providing signal redundancy). These are only some of the possibilities, as any type of suitable sensor or sensor arrangement known in the art could also be used.

Brake pedal sensor 14 provides vehicle brake system 10 with a brake signal that includes brake readings generally representative of the position, movement, exerted force, and/or state of the brake pedal. Thus, the brake readings are generally representative of driver braking demand or driver braking intent. Any number of different types of brake sensors may be used; these include non-contact-type sensors (e.g., optical sensors, electro-magnetic sensors, etc.), contact-type sensors (e.g., potentiometers, contact switches, etc.), as well as those that measure the force that the driver exerts against the brake pedal, to name a few. In a brake-by-wire application, brake sensor 14 may be integrated with a brake pedal simulator or emulator that conveys the expected mechanical feel of the brake pedal to the driver, as well as provides a brake signal.

Brake temperature sensors 16-22 provide vehicle brake system 10 with brake temperature signals that include brake readings generally representative of the temperature or thermal state of one or more brake components. In one embodiment, each of the brake temperature sensors 16-22 determines a brake rotor temperature and may do so in one of a number of different ways. For example, brake temperature sensors 16-22 may be embodied in software so that they indirectly determine or calculate the anticipated brake rotor temperature by using a thermal model and different inputs such as wheel speed, duration of a braking event, brake force, etc. This type of approach does not require a physical temperature sensor, as the sensor is actually a collection of electronic instructions and/or data structures like look-up tables and the like. In another example, brake temperature sensors 16-22 include actual sensing elements, such as imbedded thermocouples, infrared sensors, etc., that are located near the brake units and directly sense the temperature of the brake rotor, pad, lining and/or some other suitable brake component. In another example, the brake temperature sensors 16-22 are part of another component, device, system, etc. on the vehicle, like an antilock braking system (ABS) or a traction control system. Any suitable approach may be used to provide vehicle brake system 10 with information regarding the actual or estimated temperature of one or more brake components.

Humidity sensor 24 provides vehicle brake system 10 with a humidity signal that includes humidity readings generally representative of the humidity, moisture and/or precipitation in the atmosphere surrounding the vehicle. Some examples of how humidity sensor 24 may determine and provide humidity readings include: directly measuring the humidity of the atmosphere outside of the vehicle, indirectly determining the humidity by gathering readings from other components, devices, modules, systems, etc. located on the vehicle, indirectly determining the humidity by gathering readings from other nearby vehicles via vehicle-to-vehicle communication, or indirectly determining the humidity by receiving wireless transmissions that include weather reports, forecasts, etc. from a weather-related service. According to an exemplary embodiment, humidity sensor 24 is an existing component that is mounted within an engine inlet, such as one in fluid communication with an intake manifold, and already provides an engine control module (ECM) with humidity information. Other techniques and sensors are possible as well.

Electronic module 30 may include any combination of electronic processing devices, memory devices, input/output (I/O) devices, and/or other known components, and may perform various control and/or communication related functions. In an exemplary embodiment, electronic module 30 includes an electronic memory device 50 and an electronic processing device 52. These modules may be embodied in hardware, software, or some combination thereof Depending on the particular embodiment, electronic module 30 may be a single standalone unit or module, it may be incorporated or included within one or more other electronic modules or systems, it may be part of a larger network or system (e.g., an antilock braking system (ABS), a stability control system, a traction control system, a vehicle integrated control module (VICM), a motion and energy control (MEC) module, a hybrid control module, etc.), or it could embody a combination of these arrangements, to name a few possibilities. According to one embodiment, electronic module 30 is an electronic brake control module (EBCM) that controls a combination of frictional and regenerative braking operations. In such an arrangement it may control friction braking system 32 and/or regenerative braking system 34 via brake command signals sent to these systems. The present method is not limited to any particular embodiment.

Electronic memory device 50 may include any type of suitable electronic memory means and may store a variety of data, information and/or electronic instructions. This includes, for example, sensed vehicle conditions (e.g., those provided by sensors 12-24), look-up tables and other data structures, algorithms (e.g., electronic instructions used to implement the method described below), vehicle component characteristics and background information (e.g., operational settings, etc. for the different vehicle components), or more. The method described below—as well as any combination of electronic instructions and information needed to perform such an algorithm—may be stored or otherwise maintained in memory device 50.

Electronic processing device 52 may include any type of suitable electronic processor (e.g., a microprocessor, a microcontroller, an application specific integrated circuit (ASIC), etc.) that executes electronic instructions for software, firmware, programs, algorithms, scripts, etc. The exemplary processing device 52 is not limited to any one type of component or device. Electronic module 30 may be electronically connected to other vehicle devices, modules, systems, etc. via a suitable connection and can interact with them as required. These are, of course, only some of the possible arrangements, functions and capabilities of electronic module, as others are certainly possible.

Frictional braking system 32 is shown here as an electro-hydraulic braking (EHB) system, although it may be an electro-mechanical or other type of braking system, that generates frictional braking torque in a conventional manner. According to this exemplary embodiment, frictional braking system 32 includes a hydraulic unit 60 that is hydraulically coupled to brake units 72-78 which are located out at each of the vehicle wheels or corners. Although hydraulic unit 60 is schematically shown as having a separate hydraulic control unit 62, accumulator 64, master cylinder 66, and one or more actuator(s) 68 co-located with one another, it should be appreciated that any combination of these and/or other devices could instead be provided according to a number of other arrangement known in the art. For example, hydraulic control unit 62 could be integrated within EBCM 30 or some other module and be connected to actuator(s) 68 via electrical connections. Hydraulic control unit 62 may interact with EBCM 30 and act as an intermediary or driver for the various electromechanical actuators and devices in frictional braking system 32. In one example, hydraulic control unit 62 receives brake command signals from EBCM 30, processes those signals, and uses them to operate actuator(s) 68 so that the fluid pressure in hydraulic lines 70 is maintained at a desired pressure. In the case of a disc brake embodiment, the fluid pressure drives brake pistons in brake units 72-78 and controls their exerted brake force and brake torque. Skilled artisans will appreciate that hydraulic control unit 62 may perform any number of different tasks and execute a variety of different instructions, including those of the present method. Because the general structure and operation of accumulators, master cylinders, actuators and other components of hydraulic unit 60 are generally known, further description has been omitted.

Brake units 72-78 may be part of any suitable vehicle brake system, including systems that use disc brakes, drum brakes, electro-hydraulic braking, electro-mechanical braking, regenerative braking, brake-by-wire, etc. In an exemplary embodiment, brake units 72-78 are each located out at a vehicle corner and each generally includes a brake rotor 80, caliper 82, piston 88, and brake pads (not shown) and are part of an electro-hydraulic braking (EHB) system. As is appreciated by skilled artisans, a tire-wheel assembly (not shown) is attached to a hub with several lug nuts so that the tire, wheel, hub, and rotor 80 all co-rotate together. Brake caliper 82 straddles rotor 80 and carries brake piston 88 so that a compressive and frictional brake force can be applied by brake pads to opposing sides of the rotor during a braking event. The frictional brake forces slow the rotation of rotor 80 and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. It should be appreciated that the method and system described herein are not limited to use with disc brake systems and could be used with other braking systems and arrangements, including electro-mechanical brakes (EMB) having electric calipers (e-calipers) and/or drum brake systems.

Regenerative braking system 34 uses electromagnetically-derived regenerative braking torque to counteract the forward rotation of the vehicle wheels and may include a regenerative unit 90 having a control unit 92 and a motor/generator 94. Regenerative control unit 92 may control or manage certain aspects of the regenerative braking operations, including aspects of the present method, and may interact with EBCM 30, hydraulic control unit 62 and/or some other component, device, module, system, etc. in the vehicle. Motor/generator 94 may include both a motor and a generator (a so-called "mogen") for generating both positive torque (acceleration) and negative torque (braking). Motor/generator 94 may be coupled to one or more drivetrain component(s), including output shafts, axles, vehicle wheels, etc., and may use the rotation of the drivetrain component(s) to slow down the vehicle and to generate electrical energy for charging a battery (not shown). While FIG. 1 schematically depicts motor/generator 94 as a single combined device, the motor and generator could be split and provided as two separate devices, or multiple motors/generators could be provided (e.g., separate motors/generators for the front and rear wheels, separate motors/generators for each wheel, separate motors/generators for different functions, etc.), to cite a few possibilities. Thus, the following description only refers to a single combined motor/generator unit 94, even though other regenerative braking system embodiments may be used instead. Motor/generator 94 may include AC motors (e.g., a three phase AC induction motor), DC motors, brushed or brushless motors, permanent magnet motors, etc., and may include a variety of components, like cooling features, sensors, control units and/or any other suitable components known in the art.

Again, the preceding description of exemplary vehicle brake system 10 and the drawing in FIG. 1 are only intended to illustrate one potential embodiment as the following method is not confined to use with only that system. Any number of other system arrangements, combinations and architectures, including those that differ significantly from the one shown in FIG. 1, may be used instead.

Figure 2:
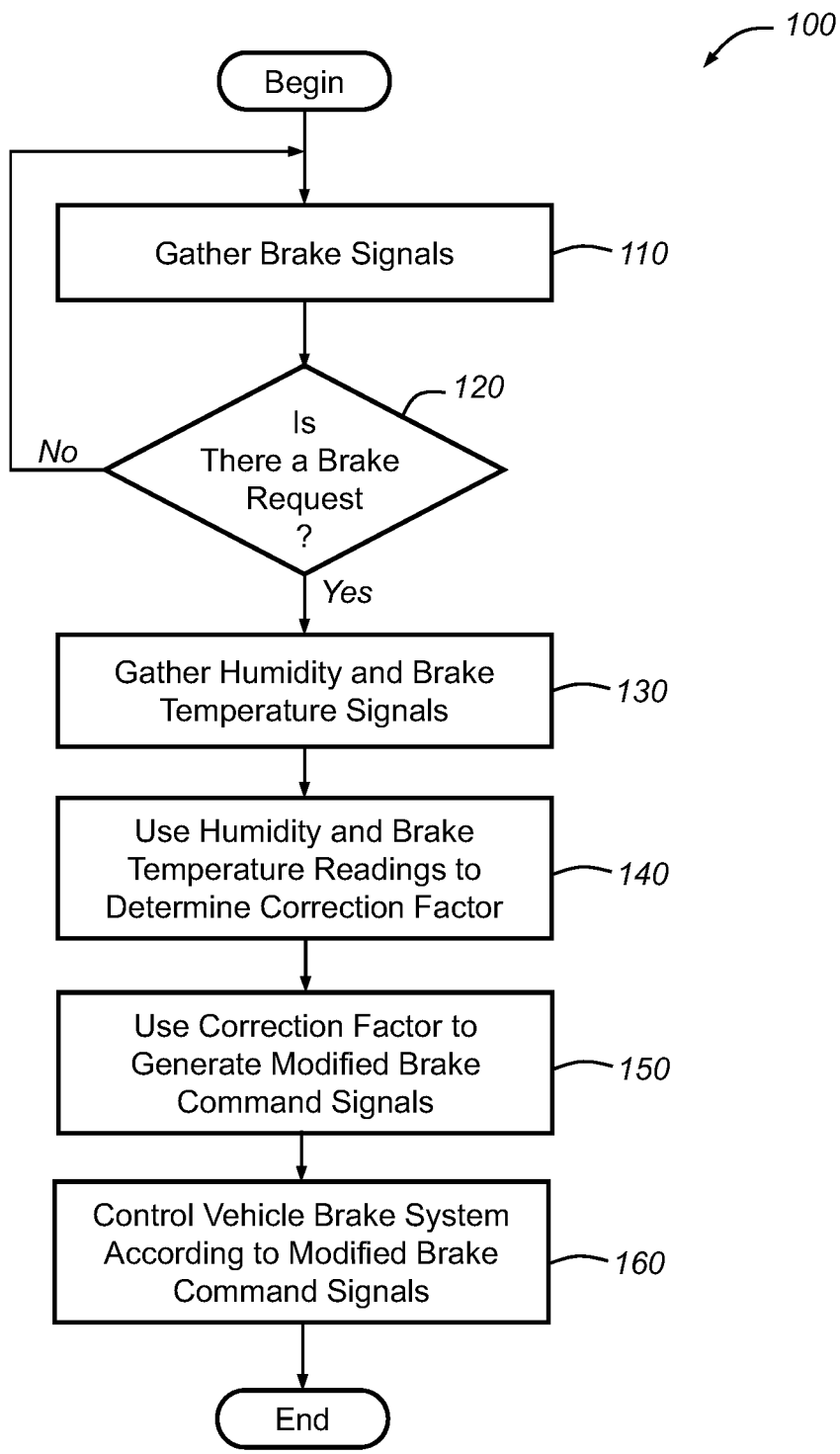
FIG. 2 is a flowchart of an exemplary method that may be used with a vehicle brake system, such as the one shown in FIG. 1.

Turning now to FIG. 2, there is shown an exemplary method 100 for operating a vehicle brake system and, more particularly, for improving the driver braking experience by reducing the effects of overly "grabby" brakes that are due to certain humidity and temperature conditions. When a vehicle is stationary during extended periods of high humidity, moisture can cause rotor corrosion and can increase the corresponding coefficient of friction ($\mu$) so that the brakes react in an unexpectedly aggressive fashion. Once the frictional brakes have been engaged several times, the rotor corrosion wears off due to the friction; however, during those first few frictional braking events, the brakes can grab in a more forceful manner than is expected. In the case of a hybrid electric vehicle (HEV) where a regenerative braking system is used initially, for example, the frictional braking system may not be engaged until the vehicle has been underway for quite some time. Thus, the exemplary method 100 is designed to address this potential issue, yet do so in a manner that allows for optimum use of a fuel-saving regenerative braking system. It is possible for method 100 to be running in the background of electronic module 30 and/or some other device whenever frictional braking system 32 is engaged, or the method may be executed whenever a change in humidity, brake temperature and/or some other reading is detected, to cite just two of the possibilities.

Beginning with steps 110 and 120, the method gathers brake signals and determines if there is a braking request. According to an example of a manual braking request, step 110 gathers brake signals from brake pedal sensor 14 or some other device and uses the readings to determine if the driver is requesting a braking event by manually engaging the brake pedal. In an example of an automated braking request, step 110 uses brake signals from electronic brake control module (EBCM) 30 or the like and uses the brake readings to determine if the vehicle is automatically requesting braking without the driver's intervention (e.g., in the case of an automated lane change system or an active cruise control system where the vehicle automatically brakes without being instructed by the driver). Of course, any suitable technique or method may be used to detect a braking request, not just the exemplary ones described above. If step 120 determines that there is a brake request, then the method proceeds to step 130; otherwise, the method loops back for continued monitoring.

Step 130 then gathers humidity and brake temperature signals from one or more sensors located around the vehicle. For instance, the method may retrieve humidity signals from a humidity sensor 24 located at an engine input or some other suitable location, as well as brake temperature signals from brake temperature sensors 16-22. As previously explained in more detail, these signals may be gathered or calculated directly or indirectly from any number of different sources in any number of different ways and are not limited to any particular embodiment. In one embodiment, humidity sensor 24 and brake temperature sensors 16-22 provide their corresponding readings to electronic module 30 on a periodic basis (e.g., every 0.5 sec-1 sec).

Figure 3:
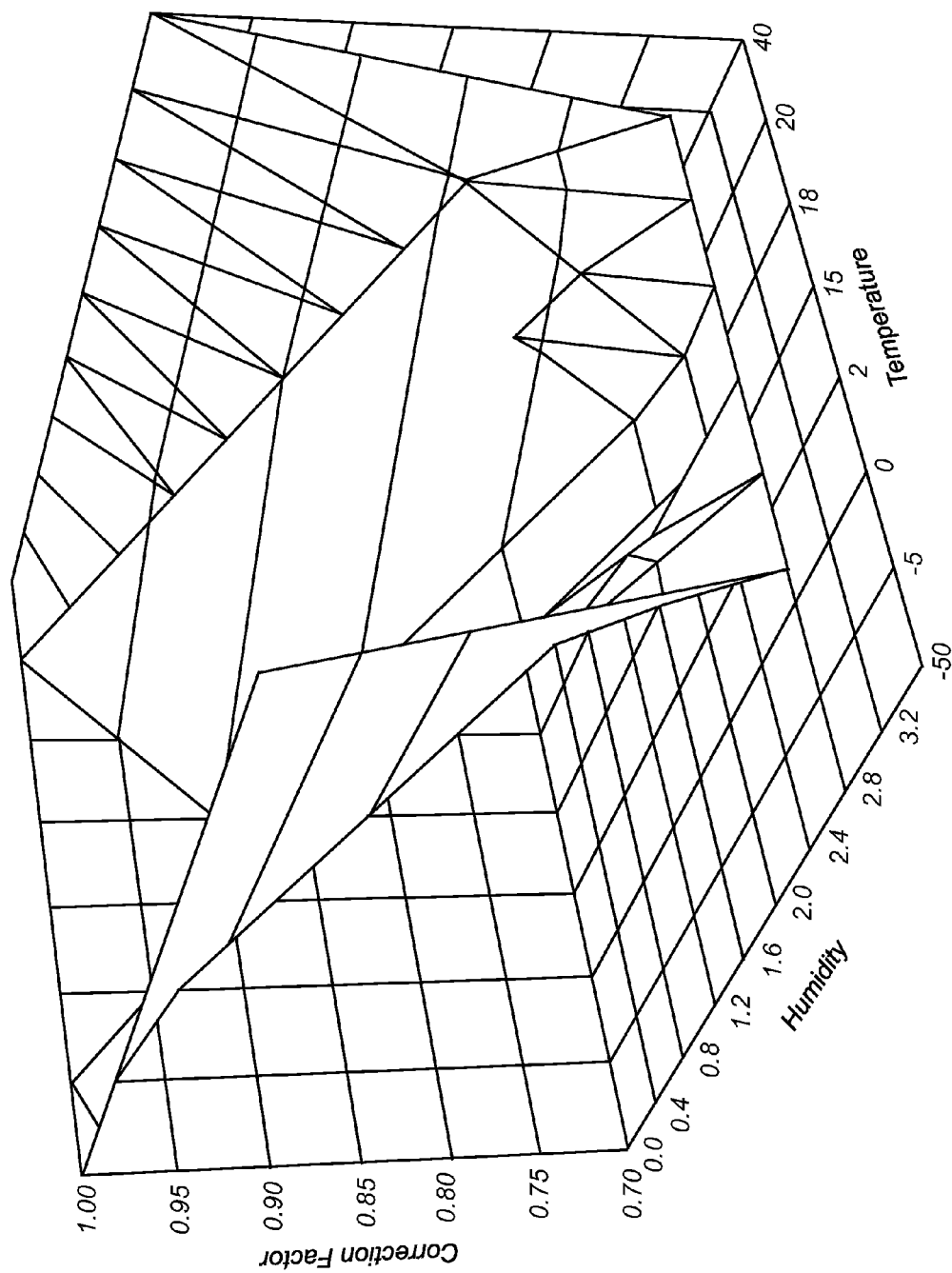
FIG. 3 is a graph showing an exemplary plot that illustrates relationships between humidity, temperature and a correction factor.

Next, step 140 uses the humidity and brake temperature readings to determine a correction factor. A "correction factor," as used herein, broadly includes any number, factor, multiplier, additive, offset and/or other value that is used to adjust or otherwise modify a brake command signal in order to compensate for changes in a coefficient of friction ($\mu$) due to humidity, temperature, etc. According to a non-limiting example of step 140, electronic module 30 uses the humidity and brake temperature readings from the previous step in conjunction with one or more look-up tables in order to generate a scalar correction factor or multiplier that can then be used to determine a modified brake command signal so that it compensates for changes in the coefficient of friction ($\mu$) of one or more of the brake components. An example of such a look-up table is illustrated in the exemplary plot 200 of FIG. 3, where brake temperature (° C.) is one input and is represented on the x-axis, specific humidity (%) is another input and is represented on the y-axis, and the correction factor is the output and is represented on the z-axis.

In this particular embodiment, the correction factor is a scalar value that ranges from about 0.7 to 1.0, however, other numerical ranges could be used instead (e.g., from about 0.7 to 1.3). Correction factors nearing 0.7 represent more aggressive compensation where more significant changes in the coefficients of friction ($\mu$) of brake components are expected, while correction factors around 1.0 represent less or no compensation because it is expected that the coefficients of friction ($\mu$) have not changed much. As seen in plot 200, when the humidity increases for a particular brake temperature reading, the correction factor generally decreases and moves away from 1.0. This is because higher humidity typically results in moisture or corrosion on the brake components, which in turn usually increases their coefficients of friction ($\mu$) and makes them more "grabby" or "touchy." Skilled artisans will appreciate that while some moisture on brake components can increase their coefficients of friction, significant amounts of water on brake components (e.g., when it is raining) usually decreases their coefficients of friction. As also illustrated in plot 200, when the brake temperature decreases for a particular humidity reading, the correction factor generally decreases and results in a more aggressive correction factor. Warmer brake temperatures usually result in less aggressive correction factors that are nearer the value 1.0 for a particular humidity reading so that they modify an underlying brake command signal in a less significant way.

Accordingly, the present method generally expects moist/cold brakes to have the highest coefficients of friction ($\mu$) and therefore assigns them more aggressive correction factors (e.g., nearer the value 0.7), while hot/dry brakes are expected to have the lowest coefficients of friction ($\mu$) and thus are given correction values nearer the value 1.0. Even when the outside humidity is quite high, if the brake temperature exceeds a certain amount (e.g., about 40° C.) then the method assumes that the frictional brakes are being engaged and that this will evaporate most of the moisture on the brake components; this explains why the correction factor is near 1.0 for high temperatures that are coupled with high humidity. It should be recognized that a correction value of 1.0 generally does not have an impact on brake command signals (a value multiplied by 1.0 is the same value). The method may also adjust the slew rate up and down, which refers to the rate at which the correction factor is allowed to change.

Step 140 may further consider other factors and variables when determining the correction factor. For instance, the vehicle type (e.g., heavy, light, etc.), the brake system type (e.g., disk, drum, etc.), the brake unit location (e.g., front, rear, left, right, etc.), the current driving style (e.g., aggressive driving, passive driving, etc.), and/or other factors could further influence the correction value. In one example, the present method may employ a correction factor that is in the range of about 0.7-1.3; the range is generally driven by the susceptibility of the brake pad and rotor to humidity, as in the example of FIG. 3. The correction value could go above 1.0 in situations where it is expected that the coefficient of friction ($\mu$) will be less than normal (i.e., situations where the brake components are more slippery). It is possible for the method to employ one lookup table for front brake units and a different lookup table for rear brake units, or to generate different correction factors for each brake unit or wheel depending on their particular brake temperature readings. In yet another embodiment, the method may average the humidity and/or brake temperature readings before inputting them into a lookup table, data structure or algorithm. It is also possible for the method to generate the correction factor based just on humidity and not consider brake temperature; in such a case, a one-dimensional look-up table could be used with humidity readings as the input and the correction factor as the output.

At step 150, the method uses the correction factor to generate modified brake command signals that take into account moisture in the vehicle brake system. Application of the correction factor may vary, but according to one exemplary embodiment, the method multiplies a base coefficient of friction value ($\mu_b$) by the correction factor in order to arrive at a modified coefficient of friction value ($\mu_m$,), and then uses the modified coefficient of friction value ($\mu_m$,) to generate the modified brake command signals. The base coefficient of friction value ($\mu_b$) may be a static value that is stored in memory device 50 at the time of vehicle manufacture, or it may be a more dynamic value that is calibrated and adjusted over time. There are numerous methods for determining and storing the base coefficient of friction value ($\mu_b$), any one of which may be employed here. The modified coefficient of friction value ($\mu_m$) may then be applied, combined or otherwise used in conjunction with the brake readings from brake pedal sensor 14 in order to produce the modified brake command signals, which are designed to more accurately and consistently deliver the brake torque requested by the driver by compensating for the moisture, humidity, temperature, etc. in vehicle brake system 10.

Step 160 then controls one or more aspects of vehicle brake system 10 according to the modified brake command signals. In a non-limiting example, electronic module 30 sends the modified brake command signals to the frictional braking system 32 (e.g., to hydraulic unit 60) so that the frictional brakes can be activated in a manner that compensates for moisture, humidity, temperature, etc., as explained above. By compensating for the detected humidity, the present method is able to optimally use either the frictional or the regenerative braking systems 32, 34, as opposed to simply disabling the regenerative braking system until the frictional brake components have warmed up and dried, as is done with some systems. This may result in fuel economy improvement.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. It is also possible for the correction factor to be added or subtracted from a base coefficient of friction value or some other value, as opposed to being multiplied. Furthermore, the correction factor does not need to be mathematically applied specifically to a coefficient of friction value, as it could be applied to a brake command signal or some other value used by the method. Lastly, it is not necessary that the correction factor be maintained in a lookup table, as it could be stored in any suitable data structure or it could be determined algorithmically. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of operating a vehicle brake system, comprising the steps of:
    (a) receiving humidity readings from a humidity sensor;
    (b) using the humidity readings to generate a modified brake command signal with an electronic module, wherein the modified brake command signal compensates for moisture in the vehicle brake system; and
    (c) controlling a frictional braking event according to the modified brake command signal compensated for moisture in the vehicle brake system.

2. The method of claim 1, wherein step (a) further comprises receiving the humidity readings from the humidity sensor and receiving brake temperature readings from one or more brake temperature sensor(s), and step (b) further comprises using the humidity readings and the brake temperature readings to generate the modified brake command signal.

3. The method of claim 2, wherein step (b) further comprises using the humidity readings and the brake temperature readings to determine a correction factor, and using the correction factor to generate the modified brake command signal so that it compensates for changes in a coefficient of friction ($\mu$) of one or more brake component(s).

4. The method of claim 3, wherein step (b) further comprises using a lookup table where the humidity readings and the brake temperature readings are used as inputs and the correction factor is an output.

5. The method of claim 3, wherein the correction factor is a scalar correction factor that is multiplied with a base coefficient of friction value ($\mu_b$) to generate a modified coefficient of friction value ($\mu_m$).

6. The method of claim 5, wherein the correction factor is a scalar correction factor that is between about 0.7 and 1.3.

7. The method of claim 3, wherein the correction factor generally decreases away from the value 1.0 when the humidity increases for a particular brake temperature reading, and the correction factor generally increases towards the value 1.0 when the humidity decreases for a particular brake temperature reading.

8. The method of claim 3, wherein the correction factor generally decreases away from the value 1.0 when the brake temperature decreases for a particular humidity reading, and the correction factor generally increases towards the value 1.0 when the brake temperature increases for a particular humidity reading.

9. The method of claim 3, wherein the correction factor is generally the most aggressive when the brakes are moist and cold, and the correction factor is generally the least aggressive when the brakes are dry and hot.

10. The method of claim 3, wherein step (b) further comprises using the humidity readings, the brake temperature readings, and at least one additional factor selected from the following list to determine the correction factor: vehicle type, brake system type, brake unit location, or current driving style.

11. The method of claim 3, wherein step (b) further comprises adjusting a slew rate up or down, and the slew rate is the rate at which the correction factor is allowed to change.

12. The method of claim 1, further comprising the step of:
    gathering brake readings and using the brake readings to determine if there is a braking request for a frictional braking event, and performing step (c) only if there is a braking request for a frictional braking event.

13. A vehicle brake system, comprising:
    a humidity sensor providing humidity readings;
    an electronic module being coupled to the humidity sensor and receiving the humidity readings, the electronic module is configured to use the humidity readings to generate modified brake command signals; and
    a frictional braking system being coupled to the electronic module and receiving the modified brake command signals, wherein the modified brake command signals control the frictional braking system in a manner that compensates for moisture in the vehicle brake system.

14. The vehicle brake system of claim 13, further comprising:
   one or more brake temperature sensor(s) providing brake temperature readings, wherein the electronic module is coupled to the brake temperature sensor(s) and is configured to use both the humidity readings and the brake temperature readings to determine the modified brake command signal.

\* \* \* \* \*